United States Patent [19]

Toussaint

[11] Patent Number: 4,792,998

[45] Date of Patent: Dec. 20, 1988

[54] RECEIVER FOR OPTICAL DIGITAL SIGNALS HAVING DIFFERENT AMPLITUDES

[75] Inventor: Hans-Norbert Toussaint, Munich, Fed. Rep. of Germany

[73] Assignee: Siemens Aktiengesellschaft, Berlin and Munich, Fed. Rep. of Germany

[21] Appl. No.: 48,778

[22] Filed: May 12, 1987

[30] Foreign Application Priority Data

May 23, 1986 [DE] Fed. Rep. of Germany ....... 3617331

[51] Int. Cl.$^4$ ............................................. H04B 9/00
[52] U.S. Cl. .................................... 455/619; 455/608; 330/308
[58] Field of Search ............................. 455/606–608, 455/617, 619; 330/59, 308; 250/214 A

[56] References Cited

U.S. PATENT DOCUMENTS

| | | | |
|---|---|---|---|
| 4,257,125 | 3/1981 | Theall, Jr. ............................. | 455/619 |
| 4,403,159 | 9/1983 | Goerne et al. . | |
| 4,499,609 | 2/1985 | Muska ..................................... | 455/619 |
| 4,679,252 | 7/1987 | Holland .................................. | 455/608 |
| 4,688,268 | 8/1987 | Holland .................................. | 455/619 |

FOREIGN PATENT DOCUMENTS 2083963 3/1982 United Kingdom .

OTHER PUBLICATIONS

Rogers, IBM Tech, vol. 28, #4B, Sep. 1984, pp. 2521-2522, "Transimpedance Input Stage for Current Amplifiers".
Transimpedance Optical Preamplifier Having a Common-Collector Front End—Electronics Letters Nov. 11, 1982, vol. 18, No. 23.
Official Data Bus Receiver for MIL-STD-1553B IEEE 1981, Porter and Muska, pp. 1319-1323.

Primary Examiner—Robert L. Griffin
Assistant Examiner—Leslie Van Beek

[57] ABSTRACT

A receiver for optical digital signals which have different amplitudes which comprises a transimpedance amplifier which has a photodiode connected to its input and which produces an output that is supplied to one of the inputs of a comparator. Oppositely poled diodes are connected between the inputs of the comparator and a reference voltage is supplied to the other input of the comparator and a capacitor is connected to the other input of the comparator which together with a resistor comprises a differentiator for the output signals of the transimpedance amplifier.

6 Claims, 1 Drawing Sheet

RECEIVER FOR OPTICAL DIGITAL SIGNALS HAVING DIFFERENT AMPLITUDES

BACKGROUND OF THE INVENTION

1. Field of the Invention

This invention relates in general to a receiver for optical digital signals having different amplitudes.

2. Description of the Prior Art

Receivers for optical digital signals usually contain a transimpedance amplifier which is coupled to the photodiode and also contains a comparator which is connected to the output of the transimpedance amplifier which emits voltage pulses according to the received light pulses. For example, the comparator output has a logical "1" when the photodiode receives light energy or, alternatively, when the photodiode does not receive light energy.

The optical signals received by such receivers usually arrive with power levels of different amplitudes since, for example, they have travelled light waveguide transmission paths which differ in length and/or have traversed light waveguides having different attenuation characteristics. The radiant intensity of the transmission diodes respectively employed can also vary from each other. In any case, it is desired that such receiver process optical signals which vary greatly from one another in power level without causing overdriving of circuits.

European Patent Application No. 0 052 221 which corresponds to U.S. Pat. No. 4,403,159 discloses a transimpedance amplifier that is realized with an operational amplifier. Using optical digital signals having a high power level, the inputs of the comparator following the operational amplifier are overdriven. Such overdriving results in delayed switching to a different signal status at the output of the comparator. Thus disturbing pulse distortion of the output signal occurs.

It is possible to couple the output of the transimpedance amplifier to the input of the comparator by way of a capacitor. Although pulse distortions can be in fact kept small in this manner, non-ambiguous relationship between the input signal and the output signal of the receiver is not established due to the absence of DC coupling.

Complicated receivers having automatic gain control are also possible. For the gain control to fulfill its object, the transmitter must be quasi-continuous, in other words, either demands must be made of the pulse duty factor or the transmitter must emit other auxiliary signals which the receiver can utilize for level control. A further disadvantage frequently results in that the control does not respond quickly enough when for example, data are sent from various transmitters to a receiver "packet by packet".

A transimpedance amplifier which has three amplifiers stages each having a transistor and with the first transistor operated in collector base circuit and the second is operated in emitter base circuit and wherein the transistor of the third amplifier stage has a load impedance at least at the emitter side and a feedback resistor is provided between the base terminal of the amplifier at the input and a circuit point of the amplifier that carries a signal in opposite phase to the amplifier input signal is disclosed by "Transimpedance Optical Pre-amplifier Having a Common Collector Front End" printed in Electronics Letters Vol. 18, No. 23, Nov. 11, 1982.

SUMMARY OF THE INVENTION

It is an object of the present invention to provide a receiver for optical signals wherein the inputs of the comparator are not overdriven and where an unambiguous relationship between the output voltage of the comparator and the optical digital signal received by the photodiode results.

A feature of the invention provides a receiver for optical digital signals having different amplitudes which includes a transimpedance amplifier which has an input E with a photodiode connected thereto and has an output A which is connected to the input of a comparator K and has back-to-back diodes D1 and D2 connected between the inputs of the comparator. A reference voltage UR is connected to a complementary input of the comparator K and a capacitor C1 which is connected to the complementary input of the comparator K with a resistor R2 provides a differentiating element for the output signals of the transimpedance amplifier.

One advantage of the receiver of the invention for optical digital signals is that the logical status at its data output is unambiguously correlated with the illumination condition of the photodiode due to the DC coupling between the amplifier output and the comparator and the comparator has a high sensitivity for small signals due to its input wiring to the diodes and a fast switching is assured as a result of the additional AC coupling between the comparator and the transimpedance amplifier.

There is also an advantage when two inputs of the comparator are supplied in that the output signals of the transimpedance amplifier may be respectively inverse relative to each other.

There is also an advantage in that the reference voltage for the comparator is produced by an operational amplifier and by a voltage divider and the photodiode is not loaded as a result.

A further advantage of the invention is that a choke is connected in series with the diodes at the comparator input and since the differentiated signal, even when its amplitude is significantly greater than the forward voltage of a diode, is thus not loaded by the low impedance of a diode which is polarized in the forward direction.

Yet another advantage is that a choke is periodically attenuated with a resistor.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
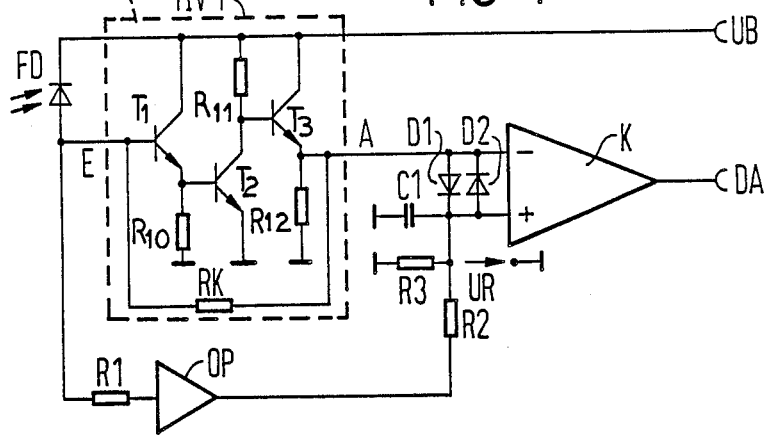
FIG. 1 is a schematic view illustrating the receiver of the invention for optical digital signals which are received by a photodiode and which have different amplitudes.

FIG. 1 illustrates a first embodiment of the invention and illustrates a transimpedance amplifier TIV1 which has an input terminal E which is connected to the base of a first transistor T1 connected in collector base circuit with a resistor R10 connected between its emitter and ground. A photodiode FD has one side connected to the input terminal E of the transimpedance amplifier TIV1 and the first transistor T1 receives an increasing base current by way of the input E from the photodiode FD when the photodiode FD is illuminated by an optical signal.

The transimpedance amplifier TIV1 includes three amplifier stages and a second transistor T2 has its base connected to the emitter of the transistor T1 and is operated in emitter-base circuit and has its emitter connected to ground and its collector connected to a reference voltage UB through a resistor R11. The second transistor T2 becomes increasingly conductive and is synchronized with the first transistor when the intensity of the optical signal falling on the photodiode FD increases.

A third transistor T3 has its base connected to the collector of the transistor T2 and its collector connected to the reference voltage UB. The emitter of the transistor T3 is connected to ground through a resistor R12 and the emitter is also connected to an output terminal A.

An output voltage of the first transimpedance amplifier TIV1 occurs at the emitter tap of the third transistor T3 at output A.

The output A is connected to the input E of the transimpedance amplifier through a feedback resistor RK. The output A is also connected to the inverting input of a comparator K. A first capacitor C1 is connected between ground and the non-inverting input of the comparator K. A third resistor R3 is connected in parallel with the capacitor C1.

Two diodes D1 and D2 are connected in parallel and are oppositely poled between the two inputs of the comparator K. The comparator K produces data output DA at its output terminal.

The input terminal E of the first transimpedance amplifier TIV1 is connected to an operational amplifier OP through a first resistor R1 and the output of the operational amplifier OP is connected to ground through a voltage divider formed of a second resistor R2 and the third resistor R3. The voltage divider junction point which is connected to the non-inverting input of the comparator K has a reference voltage UR. The operational amplifier OP is wired as a voltage follower and has a gain factor of 1.

Figure 2:
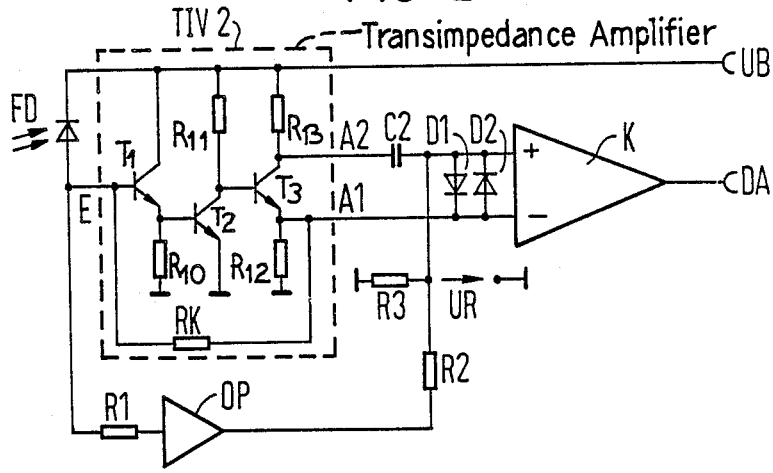
FIG. 2 illustrates a modification of the receiver of the invention.

FIG. 2 illustrates a modification of the invention illustrated in FIG. 1. A second transimpedance amplifier TIV2 illustrated in FIG. 2 differs from the first transimpedance amplifier TIV1 in that an additional resistor R13 is connected between the collector of the transistor T3 and the reference voltage UB. The collector tap A2 of the third transistor T3 of the third amplifier stage produces a second output A2 and the emitter tap produces a first output on line A1. The output A1 is connected to the inverting input of the comparator K and the second output A2 is connected to a capacitor C2 which has its other side connected to the non-inverting input of the comparator K. Two diodes D1 and D2 are connected in parallel and are oppositely poled between the two inputs of the comparator K as illustrated. The reference voltage UR occurs at the non-inverting input of the comparator K as illustrated. The other components of the embodiment of FIG. 2 are the same as illustrated in FIG. 1.

The transimpedance amplifiers TIV1 or TIV2 can also be realized by a feedback operational amplifier as illustrated in European patent application No. 0 052 221. In the embodiment of the second transimpedance amplifier TIV2 illustrated in FIG. 2, the operational amplifier must have two output taps at which output signals which are inverse relative to each other can be obtained.

The photodiode FD is supplied to the inputs of the transimpedance amplifiers TIV1 and TIV2 as illustrated in FIGS. 1 and 2. The transimpedance amplifier converts an input current fluctuation into an output voltage fluctuation. The output voltage is supplied to the inverting input of the comparator K which is a voltage comparator.

For example, the reference voltage UR produced at the output of the operational amplifier OP and the voltage divider comprising the resistors R2 and R3 will be 50 mV below the output quiescent voltage of the transimpedance amplifier TIV1 or, respectively, TIV2 output at the output terminal A or A1 when the photodiode FD does not receive light illumination. The operational amplifier OP has a high input impedance so that there is no noticeable load of the photodiode FD or, respectively, an increase in the inhibit current of the photodiode FD.

Relative to high frequency, the first resistor R1 decouples the photodiode FD from the capacitive input of the operational amplifier OP. When the value of the first resistor R1 is selected to be such that it is far lower than the input impedance of the operational amplifier OP than the voltage at the input E of the transimpedance amplifier TIV1 or, respectively, TIV2 will be equal to the voltage at the output of the operational amplifier OP. In an advantageous embodiment, the value of the first resistor R1 is far greater than the quotient of the minimum duration of a received bit and the $2\pi$ multiple of the effective input capacitance of the operational amplifier OP.

When fluctuations of the operating voltage UB occur, the reference voltage UR generated by the operational OP changes in the same way as the quiescent voltage output at the input E or, respectively, at the outputs A and A1. In this manner, an unintentional switching of the status of the data output DE of the comparator K is prevented.

When the photodiode FD is illuminated by a light pulse, than the output voltage of the transimpedance amplifier TIV will be reduced and when the output voltage of the transimpedance amplifier TIV falls below the reference voltage, then the comparator K switches to logical "1" at its data output terminal DA. In the quiescent condition, in other words, when the photodiode is not illuminated, a logical "0" is output by the data output terminal DA.

For setting a correction current which compensates the dependency of the reference voltage UR on the temperature, the third resistor R3 can be selected to be a temperature dependent resistor.

So as to compensate for fluctuations of the operation voltage UB, also an additional voltage dependent resistor can be provided which is connected at one end to the operating voltage UB and at a second end to the voltage divider junction point between the second and third resistors R2 and R3.

In the invention, the output signal of the transimpedance amplifier TIV1 in the FIG. 1 embodiment or, respectively, the amplifier TIV2 in the FIG. 2 embodiment is supplied to the inputs of the comparator K in a mixed DC-AC coupling manner. The first capacitor shown in FIG. 1 or the second capacitor C2 shown in FIG. 2 each forms a differentiating element together with the second resistor R2. The time constant of such differentiating circuit is selected such that it is small compared to the smallest transmitted pulse duration, in other words, to the light pulses received by the photodiode FD.

In the example illustrated in FIG. 1, the connection between the terminal A of the first transimpedance amplifier TIV1 to the inverting input of the comparator K serves for DC drive and for AC drive. As a result, the advantage of the DC coupled receiver is retained wherein the output signal output by the data output at terminal DA is unambiguously allocated to the input signal at the input terminal E of the first transimpedance amplifier TIV1. A fast switching of the comparator K is effected by the AC signal which is superimposed on the DC signal which is differentiated by the first capacitor C1 and the second resistor R2.

In the example illustrated in FIG. 2, a DC path is provided from the first terminal A1 of the second transimpedance amplifier TIV2 through the inverting input of the comparator K and a AC path is provided which connects the second terminal A to the non-inverting input of the comparator K by way of the second resistor C2.

Also, a limitation of the voltage adjacent to the comparator K results due to the parallel diodes D1, D2 connected between the inputs of the comparator K. The diodes D1 and D2 can be Schottky diodes so as to generate an especially low voltage between the inputs of the comparator K. However, this voltage limited by the diodes D1 and D2 allows faultless switching of the comparator K.

Figure 3:
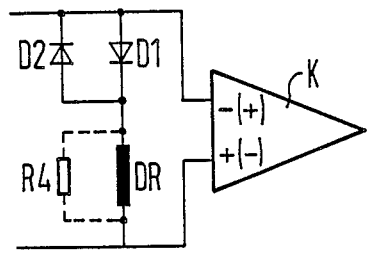
FIG. 3 illustrates a modified wiring of the input of the comparator in the receiver.

FIG. 3 illustrates the inputs of the comparator K wherein a choke DR is connected in series with the parallel diodes D1 and D2. A fourth resistor R4 is connected, if needed, in parallel to the choke DR. The choke DR connected in series with the parallel diodes D1 and D2 results in a loading of the differentiated signal adjacent to the inverting or non-inverting inputs of the comparator K due to the low impedance of the diode D1 or D2 which is polarized in the forward direction is prevented such that a fast response of the comparator K is achieved since a voltage which is higher than the voltage limited by the parallel diodes D1 and D2 occurs.

The choke DR can be aperiodically attenuated such that by way of the fourth resistor R4 together with the first capacitor illustrated in FIG. 1 or second capacitor C2 illustrated in FIG. 2 oscillations will not occur.

Although the invention has been described with respect to preferred embodiments, it is not to be so limited as changes and modifications can be made which are within the full intended scope of the invention as defined by the appended claims.

I claim as my invention:

1. A receiver for optical digital signals having different amplitudes comprising, a transimpedance amplifier (TIV2) having an input, a first output and a second output, a signal at said first output being inverse to a signal at said input and said second output, a photodiode (FD) connected to the input (E) of said amplifier (TIV2), a comparator having an inverting and a non-inverting input, with the inverting input connected to the first ouput (A1) of said amplifier (TIV2), a capacitor (C2) connected between the second output (A2) of said amplifier (TIV2) and the non-inverting input of said comparator, a pair of diodes (D1, D2) connected in parallel and oppositely poled between said two inputs of said comparator (K) and a resistor (R2) connected to said non-inverting input of said comparator, said capacitor (C2) and said resistor (R2) forming a differentiating circuit; wherein a transistor (T3) forms the output stage of the transimpedance amplifier (TIV2) and said first output (A1) of said amplifier (TIV2) is taken from the emitter of said trnsistor (T3) and said second output (A2) of said amplifier (TIV2) is taken at the collector of said transistor.

2. A receiver for optical digital signals having different amplitudes, comprising, a transimpedance amplifier (TIV1) having an input and an output, a signal at said output being inverse to a signal at said input, a photodiode (FD) connected to the input (E) of said amplifier (TIV), a comparator (K) having an inverting and a non-inverting input with the inverting input connected to the output (A) of said amplifier, a pair of diodes (D1, D2) connected in parallel and oppositely poled between said two inputs of said comparator (K); a reference voltage (UR) connected to the non-inverting input of said comparator (K); a capacitor (C1) and a resistor (R2) connected to the non-inverting input of the comparator (K) and said capacitor (C1) and resistor (A2) forming a differentiating circuit for the output signals of said transimpedance amplifier (TIV1); an operational amplifier (OP) and said operational amplifier (OP) wired as a voltage follower which has a gain of 1 connected between the input (E) of the transimpedance amplfiier (TIV) and said resistor (R2), a further resistor (R3) forming a voltage divider with said resistor (R2), whereby the reference voltage (UR) is occurring at the junction point between said resistor (R2) and said furhher resistor (R3).

3. A receiver for optical digital signals according to claims 1 or 2, wherein said pair of diodes (D1, D2) are Schottky diodes.

4. A receiver for optical digital signals according to claims 1 or 2 wherein a choke (DR) is connected in series with said diodes (D1, D2) between said two inputs of said comparator.

5. A receiver for optical digital signals according to claim 1, comprising an additional resistor (R4) connected in parallel to said choke (DR).

6. A receiver for optical digital signals according to claim 2, wherein a fourth resistor (R1) is connected between an input of the operational amplifier (OP) and said photodiode (FD) so as to decouple the operational amplifier in terms of high-frequency from the input (E) of the transimpedance amplifier (TIV) and said fourth resistor (R1) has a value which is far smaller than the input impedance of said operational amplifier (OP) and has a value which is far greater than the quotient of the minimum duration of a received bit and the 2 $\pi$-fold multiple of the effective input capacitance of the operational amplifier (OP).

* * * * *